(12) United States Patent
Kasai

(10) Patent No.: US 9,178,281 B2
(45) Date of Patent: Nov. 3, 2015

(54) DIELECTRIC ANTENNA AND MATERIAL FOR THE SAME

(75) Inventor: Masanori Kasai, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 630 days.

(21) Appl. No.: 13/558,444

(22) Filed: Jul. 26, 2012

(65) Prior Publication Data

US 2012/0293374 A1 Nov. 22, 2012

Related U.S. Application Data

(63) Continuation of application No. PCT/JP2011/050626, filed on Jan. 17, 2011.

(30) Foreign Application Priority Data

Jan. 27, 2010 (JP) ................................. 2010-015038

(51) Int. Cl.
| | |
|---|---|
| *H01Q 9/04* | (2006.01) |
| *H01Q 1/24* | (2006.01) |
| *H01Q 1/38* | (2006.01) |
| *C08K 5/02* | (2006.01) |
| *H01B 3/42* | (2006.01) |
| *H01B 3/44* | (2006.01) |
| *C09K 19/38* | (2006.01) |
| *C09K 19/52* | (2006.01) |
| *C08K 3/00* | (2006.01) |

(52) U.S. Cl.
CPC ................. *H01Q 9/0421* (2013.01); *C08K 5/02* (2013.01); *H01B 3/422* (2013.01); *H01B 3/445* (2013.01); *H01Q 1/243* (2013.01); *H01Q 1/38* (2013.01); *H01Q 9/0442* (2013.01); *C08K 3/0033* (2013.01); *C09K 19/38* (2013.01); *C09K 2019/521* (2013.01); *C09K 2019/523* (2013.01)

(58) Field of Classification Search
CPC .......... H01B 3/422; H01B 3/445; C08K 5/02; C08K 5/0033; C09K 19/38; C09K 2019/521
See application file for complete search history.

(56) References Cited

U.S. PATENT DOCUMENTS

| | | | |
|---|---|---|---|
| 7,732,531 B2 | 6/2010 | Yoshimoto et al. | |
| 8,717,245 B1 * | 5/2014 | Krivokapic et al. | ........... 343/795 |
| 2002/0067317 A1 | 6/2002 | Sakurada | |
| 2008/0252535 A1 * | 10/2008 | Parsche | ......................... 343/702 |
| 2009/0021443 A1 | 1/2009 | Sakurada | |

FOREIGN PATENT DOCUMENTS

| | | |
|---|---|---|
| CN | 1842574 A | 10/2006 |
| JP | 10-025402 A | 1/1998 |
| JP | 2001-026699 A | 1/2001 |
| JP | 2004-006316 A | 1/2004 |
| JP | 2009-197209 A | 9/2009 |
| WO | WO-2005-081363 A1 | 9/2005 |

OTHER PUBLICATIONS

PCT/JP2011/050626 Written Opinion dated Apr. 12, 2011.

* cited by examiner

*Primary Examiner* — Shean C Wu
(74) *Attorney, Agent, or Firm* — Arent Fox LLP

(57) ABSTRACT

A dielectric block provided in a dielectric antenna is formed with an organic polymer material containing a liquid crystal polymer and polytetrafluoroethylene. The added amount of polytetrafluoroethylene is 2 to 15% by volume based on the volume of the dielectric block. Preferably, the liquid crystal polymer has a flow beginning temperature of no lower than 310° C. and no higher than 335° C. The dielectric block may further contain a dielectric inorganic filler and in this case, the added amount of dielectric inorganic filler is 45% by volume or less based on the volume of the dielectric block.

12 Claims, 1 Drawing Sheet

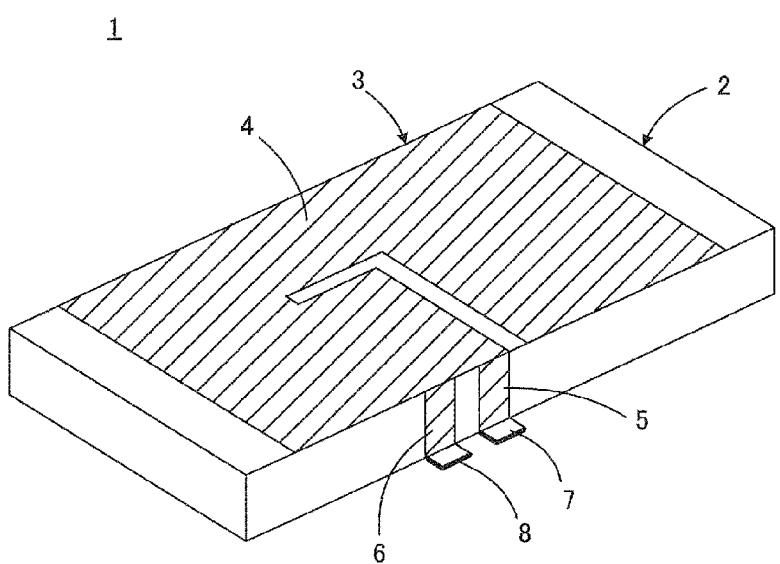

US 9,178,281 B2

DIELECTRIC ANTENNA AND MATERIAL FOR THE SAME

CROSS REFERENCE TO RELATED APPLICATIONS

The present application is a continuation of International application No. PCT/JP2011/050626, filed Jan. 17, 2011, which claims priority to Japanese Patent Application No. 2010-015038, filed Jan. 27, 2010, the entire contents of each of which are incorporated herein by reference.

FIELD OF THE INVENTION

This invention relates to a dielectric antenna, and particularly to improvement of a dielectric block provided in the dielectric antenna in terms of a material.

BACKGROUND OF THE INVENTION

In recent years, mobile phones have been increasingly reduced in size and weight and accordingly, reduction in size and weight has also been required for antennas mounted on mobile phones. In the mobile phone, a dielectric antenna, the body part of which is formed with a dielectric block, is usually used, and for keeping up with the reduction in size and weight described above, a dielectric material used for the dielectric block is desired to have a high dielectric constant and a low specific gravity.

On the other hand, antenna built-in mobile phones are mainstream from the viewpoint of designability of mobile phones. The antenna built-in type also contributes to downsizing of mobile phones. Consequently, a dielectric antenna is required which has such excellent processability that the shape of its dielectric block can be flexibly changed so that the dielectric antenna can be placed in a narrow space such as a gap between a main frame of a mobile phone and a wiring board within the main frame.

Under such a background, a composite material of a filler including a dielectric ceramic and a resin is favorably used as a material of the dielectric block. This is because if such a composite material is used, the dielectric ceramic increases the dielectric constant of the dielectric block, and resultantly allows downsizing of the dielectric antenna, and the resin contributes to reduction in weight and allows the dielectric block to be formed into any form with freedom.

A composite material, which is as described above and also interesting to this invention, is described in, for example, Japanese Patent Application Laid-Open No. 2004-6316 (Patent Document 1). Patent Document 1 describes a composite dielectric material including a dielectric inorganic filler and an organic polymer material, and discloses the use of polypropylene as an organic polymer material.

However, the composite material described in Patent Document 1 does not have excellent heat resistance because polypropylene is used as an organic polymer material, and can encounter such a problem that a solder reflow process cannot be applied for mounting a dielectric antenna including a dielectric block formed with the composite material.

Thus, it has been proposed to use, as a resin, a liquid crystal polymer having excellent heat resistance in a composite material to form a dielectric block. However, the use of a liquid crystal polymer may encounter such a problem that stringing occurs during injection molding of a dielectric block, and consequently continuous molding is hindered.

For solving the problem of stringing described above while solving the problem of heat resistance, it is proposed in, for example, Japanese Patent Application Laid-Open No. 2009-197209 (Patent Document 2) to use in a composite material two different kinds of liquid crystal polymers, of which the gradients from an endothermic peak temperature at which the polymer is phase-transferred from a solid phase to a liquid phase to a temperature at which the polymer has a melt viscosity satisfying 1000 Pa·s or less are mutually different.

However, it has been found that there arises such a problem that a part of a molding material is deposited and remains on a mold when injection molding of a dielectric block is continuously carried out using the material described in Patent Document 2. This hinders continuous molding of dielectric blocks to reduce yields in production of dielectric antennas, resulting in an increase in costs of dielectric antennas.

Patent Document 1: Japanese Patent Application Laid-Open No. 2004-6316
Patent Document 2: Japanese Patent Application Laid-Open No. 2009-197209

SUMMARY OF THE INVENTION

Thus, it is an object of this invention to provide a dielectric antenna including a dielectric block formed with a molding material that can solve the problem described above.

This invention is directed to a dielectric antenna including a dielectric block, a radiation electrode provided on the dielectric block, and a power supply terminal and a grounding terminal each electrically connected to the radiation electrode, wherein the dielectric block contains an organic polymer material.

For solving the technical problem described above, this invention is characterized in that the organic polymer material contains a liquid crystal polymer and polytetrafluoroethylene, and the added amount of polytetrafluoroethylene is 2 to 15% by volume based on the volume of the dielectric block.

In this invention, the liquid crystal polymer preferably has a flow beginning temperature of no lower than 310° C. and no higher than 335° C. Here, the flow beginning temperature refers to a temperature at which the viscosity of an extruded product reaches 4800 Pa·s when using a flow tester (cut die having a diameter of 1 mm and a length of 10 mm), 2 g of liquid crystal powder is placed in a cylinder, and heated at a rate of 4° C./minute under a load of 9.8 MPa.

In this invention, preferably the dielectric block further contains a dielectric inorganic filler, and the added amount of the dielectric inorganic filler is 45% by volume or less based on the volume of the dielectric block.

The above-described dielectric inorganic filler more preferably contains calcium carbonate.

According to this invention, an organic polymer material contained in a dielectric block contains a liquid crystal polymer and polytetrafluoroethylene, and both the liquid crystal polymer and polytetrafluoroethylene have heat resistance, so that heat resistance can be imparted to a dielectric antenna such that solder reflow can be endured in the first place.

Polytetrafluoroethylene, when added in an amount of 2 to 15% by volume based on the volume of dielectric block, acts to improve mold releasability of an organic polymer material without hindering moldability. As a result, such a problem that a part of a molding material is deposited and remains on a mold when injection molding of a dielectric block is continuously carried out can be advantageously avoided. Further, polytetrafluoroethylene incompatible with a liquid crystal polymer acts as an organic filler in a material of a dielectric block to reduce a melt tension, so that occurrence of stringing during injection molding can be suppressed. Therefore, continuous molding of dielectric blocks can be efficiently conducted, and an increase in yields in production of dielectric antennas and hence a reduction in costs of dielectric antennas can be expected.

As described above, it has been found that if an organic polymer material contains polytetrafluoroethylene in addition to a liquid crystal polymer, there arises a situation in which a blister is easily generated in a dielectric block due to temperature rising in a process after molding such as, for example, a solder reflow process. The present inventor has found that in this case, the blister can be suppressed if a liquid crystal polymer, the flow beginning temperature of which is no lower than 310° C. and no higher than 335° C., is used. That is, in this invention, generation of a blister in a dielectric block can be advantageously suppressed if a liquid crystal polymer, the flow beginning temperature of which is no lower than 310° C. and no higher than 335° C., is used.

In this invention, if a dielectric block further contains a dielectric inorganic filler with an added amount of 45% by volume or less, the dielectric constant of the dielectric block can be improved without hindering moldability, resulting in downsizing of a dielectric antenna.

If the above-described dielectric inorganic filler contains calcium carbonate, Q of a dielectric block can be improved to improve antenna efficiency, but it has been found that inclusion of calcium carbonate increases the possibility of generation of a blister. Therefore, in this case, the use of a liquid crystal polymer having a specific flow beginning temperature as described above is more significant.

BRIEF EXPLANATION OF THE DRAWING

FIG. 1 is a perspective view showing an external appearance of a dielectric antenna 1 according to one embodiment of this invention.

DETAILED DESCRIPTION OF THE INVENTION

First, the structure of a dielectric antenna 1 according to one embodiment of this invention will be described with reference to FIG. 1.

The dielectric antenna 1 includes a dielectric block 2 in the shape of, for example, a rectangular parallelepiped, which forms a body part thereof.

A radiation electrode 3 is provided on a dielectric block 2. The radiation electrode 3 has a main part 4 extending on a main surface of the dielectric block 2, and first and second draw parts 5 and 6 drawn from the main part 4 and extending on a side surface of the dielectric block 2.

To the radiation electrode 3 are electrically connected a power supply terminal 7 and a grounding terminal 8. More specifically, the power supply terminal 7 is connected to the first draw part 5, and the grounding terminal 8 is connected to the second draw part 6.

The radiation electrode 3, the power supply terminal 7 and the grounding terminal 8 are formed of, for example, a metal plate to form these components integrally. As a metal plate, for example, a plate made of phosphor bronze is used, and the metal plate is plated with gold, silver or copper as required.

For producing the dielectric antenna 1, the dielectric block 2 is obtained by injection molding using the molding material described later, but in this injection molding, preferable is application of insert molding in which the metal plate to form the discharge electrode 3, the power supply terminal 7 and the grounding terminal 8 is inserted in a mold to carry out molding. In the insert molding, at least a part of the metal plate may be formed at the same time. Outsert molding may be applied instead of insert molding.

Instead of forming the radiation electrode 3 integrally with the power supply terminal 7 and the grounding terminal 8 from the metal plate as described above, the radiation electrode 3 may be formed on the dielectric block 2 by applying a method such as plating, sputtering or vapor deposition after molding the dielectric block 2 into a predetermined form, or the separately prepared power supply terminal 7 and the grounding terminal 8 may be connected to first and second draw parts 5 and 6 of the radiation electrode 3, respectively.

In this dielectric antenna 1, a high-frequency current is supplied to the radiation electrode 3 through the first draw part 5 from the power supply terminal 7, whereby a high-frequency electromagnetic field is generated, and an electric wave is sent. On the other hand, when an electric wave is received, a high-frequency current is induced in the radiation electrode 3, and transmitted to an external RF circuit through the grounding terminal 8 from the second draw part 6.

The shape and structure of the dielectric antenna 1 is not limited to that shown in the FIGURE.

For example, multiple sets of the radiation electrode 3, the power supply electrode 7 and the grounding electrode 8 may be provided. The shape and arrangement of each of the radiation electrode 3, the power supply electrode 7 and the grounding electrode 8 can be appropriately changed for adjustment of the frequency.

The dielectric block 2 may be in a shape other than the shape of a rectangular parallelepiped, for example, a disk shape, or a shape in which a cavity is provided on a main surface opposite to a main surface provided with the radiation electrode 3.

The dielectric block 2 may have a layered structure in which multiple dielectric layers are laminated.

In the dielectric antenna 1 having such a structure, the dielectric block 2 is formed of a composite material of an organic polymer material containing a liquid crystal polymer and polytetrafluoroethylene and a dielectric inorganic filler. Both the liquid crystal polymer and polytetrafluoroethylene contained in the organic polymer material have heat resistance, so that heat resistance can be imparted to the dielectric antenna 1 in the first place such that solder reflow, for example, can be endured (e.g. heat resistance to a maximum temperature of 265° C. when lead-free solder is used in a reflow process). The dielectric inorganic filler is added for improvement of the dielectric constant of the dielectric block 2, but may not be added in some cases depending on the structure of the dielectric antenna.

As the liquid crystal polymer, those having 2-hydroxy-6-naphthoic acid, hydroquinone, 2,6-naphthalenedicarboxylic acid and terephthalic acid as constituent monomers are advantageously used. The composition ratios of the constituent monomers are not particularly limited, but for example, repeating structural units represented by the following formulae (I), (II), (III) and (IV) are included, the repeating structural unit (I) constitutes 40 to 74.8 mol %, the repeating structural unit (II) constitutes 12.5 to 30 mol %, the repeating structural unit (III) constitutes 12.5 to 30 mol % and the repeating structural unit (IV) constitutes 0.2 to 15 mol % based on the total of the repeating structural units, and the molar ratios of repeating structural units represented by (III) and (IV) satisfy the requirement of $(III)/\{(III)+(IV)\} \geq 0.5$.

[Chemical Formula 1]

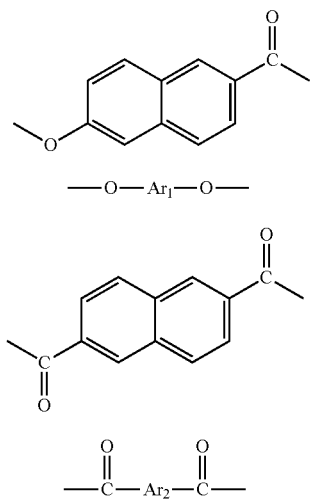

(wherein, $Ar_1$ and $Ar_2$ in (II) and (IV) are each independently a group selected from 1,4-phenylene and bivalent residues having two or more phenylenes linked at a para-position.)

Polytetrafluoroethylene acts to improve mold releasability of a molding material containing an organic polymer material and solve the problem of stringing. Therefore, such a problem that a part of a molding material is deposited and remains on a mold when injection molding of the dielectric block 2 is continuously carried out can be advantageously avoided. The added amount of polytetrafluoroethylene is selected to be 2 to 15% by volume based on the volume of the dielectric block 2. If the added amount is less than 2% by volume, satisfactory mold releasability cannot be exhibited, while if the added amount is more than 15% by volume, fluidity of a molding material may be reduced, resulting in degradation of moldability such as, for example, short shot generation.

It has been found that if an organic polymer material contains polytetrafluoroethylene in addition to a liquid crystal polymer, there arises a situation in which a blister is easily generated in the dielectric block 2 due to temperature rising in a process after molding such as, for example, a solder reflow process as described above, although such a problem does not occur if the organic polymer material contains no polytetrafluoroethylene. This can be assumed that because a liquid crystal polymer and polytetrafluoroethylene are not compatible with each other, adhesiveness therebetween decreases.

As a result of constantly conducting studies for solving the problem, the present inventor has recognized possible involvement of the molecular weight of a liquid crystal polymer or the flow beginning temperature. Thus, it has been found that if a liquid crystal polymer having a flow beginning temperature of no lower than 310° C. and no higher than 335° C. is used, the above-described blister can be suppressed. Therefore, in this invention, preferable is the use of a liquid crystal polymer having a flow beginning temperature of no lower than 310° C. and no higher than 335° C.

If a liquid crystal polymer having a flow beginning temperature lower than 310° C. is used, a blister is easily generated owing to volatilizing of low-molecular weight components of the liquid crystal polymer. On the other hand, if the flow beginning temperature is higher than 335° C., a short shot may be generated in a molded product because a molding material does not show adequate fluidity during molding.

By changing the temperature of heat treatment applied to the liquid crystal polymer, its molecular weight is changed, and accordingly the flow beginning temperature can be changed. That is, the flow beginning temperature rises as the molecular weight increases.

More specifically, for obtaining a liquid crystal polymer, each of 2-hydroxy-6-naphthoic acid, hydroquinone, 2,6-naphthalenedicarboxylic acid and terephthalic acid is weighed to a predetermined amount, and mixed with one another, 1-methylimidazole is added as a catalyst, and the resulting mixture is stirred at room temperature for 15 minutes, and then heated with stirring. When the internal temperature reaches 145° C., the mixture is stirred at the same temperature for an hour.

Next, the mixture is heated from 145° C. to 310° C. for 3 hours and 30 minutes while distilling away acetic acid distilled as a by-product and unreacted acetic anhydride, and then kept at the same temperature for 3 hours to obtain a liquid crystal polymer. The obtained liquid crystal polymer is cooled to room temperature, and ground by a grinder to obtain a powder of a liquid crystal polymer.

The powder thus obtained is heated from 25° C. to 250° C. for an hour, then heated from 250° C. to a predetermined temperature (hereinafter referred to as "secondary heat-up temperature") for 3 hours, then kept at the same temperature for 3 hours and subjected to solid phase polymerization, and thereafter the powder after solid phase polymerization is cooled.

The post-cooling powder (liquid crystal polymer) thus obtained has been found to show a flow beginning temperature of 310° C. when the secondary heat-up temperature is 295° C., show a flow beginning temperature of 320° C. when the secondary heat-up temperature is 305° C., show a flow beginning temperature of 330° C. when the secondary heat-up temperature is 315° C. and show a flow beginning temperature of 335° C. when the secondary heat-up temperature is 320° C.

For obtaining a desired flow beginning temperature, there is also a method of controlling the time for giving the secondary heat-up temperature in addition to a method of controlling the secondary heat-up temperature as described above.

The reason why not the molecular weight but the flow beginning temperature is used as a factor for defining a liquid crystal polymer in this invention is that a liquid crystal polymer has excellent solvent resistance, and is therefore difficult to dissolve in a solution that is used in normal molecular weight measurement (GPC) (such as tetrahydrofuran), and the molecular weight cannot be measured with high accuracy.

When a molding material to form the dielectric block 2 contains a dielectric inorganic filler for improving the dielectric constant of the dielectric block 2, the added amount thereof is selected so that the dielectric inorganic filler constitutes 45% by volume or less based on the volume of the dielectric block 2, i.e. it is contained in an amount of 45% by volume or less of the molding material. Accordingly, hindrance of moldability of the dielectric block 2 can be prevented.

As the dielectric inorganic filler, a calcium titanate powder and a calcium carbonate powder are preferably used. In consideration of the fact that calcium titanate more significantly contributes principally to the improvement of the dielectric constant and calcium carbonate more significantly contributes principally to the improvement of Q, the added amounts or addition ratios thereof are selected. The addition ratio of calcium carbonate is preferably 50% by weight or less based on the total weight of dielectric inorganic filler.

Also, addition of the dielectric inorganic filler has been found to promote generation of a blister. Particularly, when calcium carbonate is used as a dielectric inorganic filler, adhesion between the dielectric inorganic filler and the liquid crystal polymer decreases because calcium carbonate has a base point amount less than that of calcium titanate, so that a blister is more easily generated. Accordingly, as described above, it is more effective and significant to define the flow beginning temperature of a liquid crystal polymer as means for suppressing generation of a blister when a dielectric inorganic filler, particularly calcium carbonate, is added.

Examples of experiments carried out for determining a range or a preferable range in this invention will now be described.

EXPERIMENTAL EXAMPLE 1

In Experimental Example 1, evaluations were made concerning the relationship between the added amount of polytetrafluoroethylene and mold releasability and moldability.

First, a calcium titanate powder having an average particle diameter of 1.6 μm (base point amount: 0.019 mmol/g) and a calcium carbonate powder having an average particle diameter of 10.0 μm (base point amount: 0.013 mmol/g) were prepared as a ceramic powder to form a dielectric inorganic filler.

As an organic polymer material, polytetrafluoroethylene was prepared and a liquid crystal polymer was prepared. Here, as the liquid crystal polymer, a sample prepared in the following manner was used.

Constituent monomers of the liquid crystal polymer were weighed so as to have 55.0 mol % of 2-hydroxy-6-naphthoic acid, 22.5 mol % of hydroquinone, 17.5 mol % of 2,6-naphthalenedicarboxylic acid and 5.0 mol % of terephthalic acid, these monomers were mixed, a slight amount of 1-methylimidazole was added as a catalyst, and the resulting mixture was stirred at room temperature for 15 minutes and heated with stirring. When the internal temperature reached 145° C., the mixture was stirred at the same temperature for an hour.

Next, the mixture was heated from 145° C. to 310° C. for 3 hours and 30 minutes while distilling away acetic acid distilled as a by-product and unreacted acetic anhydride, and then kept at the same temperature for 3 hours to obtain a liquid crystal polymer. The obtained liquid crystal polymer was cooled to room temperature, and ground by a grinder to obtain a powder of a liquid crystal polymer.

Next, the powder thus obtained was heated from 25° C. to 250° C. for an hour, then heated from 250° C. to 305° C. for 3 hours, then kept at the same temperature for 3 hours and subjected to solid phase polymerization, and thereafter the powder after solid phase polymerization was cooled.

For the powder after solid phase polymerization, the flow beginning temperature was evaluated in the following manner. Using a flow tester (cut die having a diameter of 1 mm and a length of 10 mm), 2 g of the resin powder was placed in a cylinder, preliminarily heated at 280° C. for 3 minutes, and heated at a rate of 4° C./minute under a load of 9.8 MPa, a temperature was measured when the viscosity of an extruded product reached 4800 Pa·s, and this temperature was designated as the flow beginning temperature of a liquid crystal polymer. As a result, the flow beginning temperature of the liquid crystal polymer was 320° C.

Next, the liquid crystal polymer, polytetrafluoroethylene, a calcium titanate powder and a calcium carbonate powder were each weighed so that the composition ratio shown in Table 1 was obtained, and a twin-screw extruder was then used to melt and mix these components at a temperature of 330° C. The obtained composite material was formed into a string through a head hole during melting and mixing, and simultaneously cut to a dimension of about 2 mm (diameter)×5 mm (length) by a pelletizer to provide pellets for injection molding.

Next, using the pellets for injection molding, continuous injection molding was carried out while giving a temperature of 320° C. for obtaining a dielectric block, and mold releasability and moldability were evaluated as shown in Table 1.

For mold releasability, continuous molding was carried out, and a shot number, at which a molding material started to be deposited on a mold, was determined, and in the case where no molding material was deposited on a mold up to the shot number of 40000, the sample was judged as having good mold releasability and marked with "○" in Table 1. On the other hand, in the case where a molding material deposited on a mold at a shot number less than 40000, the sample was judged as having poor moldability and marked with "x" in Table 1.

For moldability, in the case where no short shot was generated in a molded product, the sample was judged as having good moldability and marked with "○" in Table 1. On the other hand, in the case where a short shot was generated in a molded product, the sample was judged as having poor moldability and marked with "x" in Table 1.

TABLE 1

| | Composition Ratio (% by volume) | | | | Evaluation Results for Materials | |
| --- | --- | --- | --- | --- | --- | --- |
| Sample Number | Liquid Crystal Polymer | Polytetra-fluoro-ethylene | Calcium Titanate | Calcium Car-bonate | Mold Releasability | Mold-ability |
| 1 | 73.0 | 2.0 | 13.2 | 11.8 | ○ | ○ |
| 2 | 70.0 | 5.0 | 13.2 | 11.8 | ○ | ○ |
| 3 | 65.0 | 10.0 | 13.2 | 11.8 | ○ | ○ |
| 4 | 60.0 | 15.0 | 13.2 | 11.8 | ○ | ○ |
| 5 | 96.0 | 4.0 | 0 | 0 | ○ | ○ |
| 6 | 75.0 | 0 | 13.2 | 11.8 | X (2000 Shots) | ○ |
| 7 | 74.0 | 1.0 | 13.2 | 11.8 | X (8000 Shots) | ○ |
| 8 | 55.0 | 20.0 | 13.2 | 11.8 | — | X |

Referring to Table 1, good results were obtained for both mold releasability and moldability by adding polytetrafluoroethylene in an amount of no less than 2% by volume and no more than 15% by volume as in samples 1 to 5. For mold releasability, it is believed that mold releasability was improved by causing polytetrafluoroethylene to be deposited on the surface of a molded product by adding 2% by volume or more of polytetrafluoroethylene. For moldability, on the other hand, it is believed that reduction of fluidity was prevented by limiting the added amount of polytetrafluoroethylene to no more than 15%.

In contrast, samples 6 and 7 with the added amount of polytetrafluoroethylene being less than 2% by volume had poor mold releasability. More specifically, deposition of a molding material on a mold occurred at the shot number of 2000 in sample 6, and deposition of a molding material on a mold occurred at the shot number of 8000 in sample 7.

Sample 8 with the added amount of polytetrafluoroethylene being more than 15% by volume had poor moldability. This is believed that because the relative amount of liquid crystal polymer as a matrix decreases, fluidity of a molding material is reduced. In sample 8, mold releasability was not evaluated due to poor moldability.

EXPERIMENTAL EXAMPLE 2

In Experimental Example 2, evaluations were made for the relationship between the flow beginning temperature of a liquid crystal polymer and moldability and presence/absence of a blister.

In Experimental Example 2, multiple kinds of samples each having the flow beginning temperature shown in Table 2 were prepared as the liquid crystal polymer. Here, the "secondary heat-up temperature" was controlled for obtaining liquid crystal polymers having different flow beginning temperatures.

Operations similar to those in Experimental Example 1 were carried out except that a liquid crystal polymer, polytetrafluoroethylene, a calcium titanate powder and a calcium carbonate powder were weighed so as to have composition ratios of 72.0% by volume, 3.0% by volume, 13.2% by volume and 11.8% by volume, respectively, and melted and mixed, and moldability was evaluated as shown in Table 2.

In Experimental Example 2, presence/absence of a blister was evaluated as shown in Table 2. That is, a reflow heat resistance test with a maximum temperature of 265° C. was carried out, and a molded product was observed after the test to check presence/absence of a blister. In the case where no blister was observed, the sample was judged as having a good result and marked with "○" in Table 2. On the other hand, in the case where a blister was observed, the sample was judged as having a poor result and marked with "×" in Table 2.

TABLE 2

| Sample Number | Flow Beginning Temperature of Liquid Crystal Polymer (° C.) | Evaluation Results for Materials | |
|---|---|---|---|
| | | Moldability | Blister |
| 11 | 310 | ○ | ○ |
| 12 | 320 | ○ | ○ |
| 13 | 330 | ○ | ○ |
| 14 | 335 | ○ | ○ |
| 15 | 305 | ○ | × |
| 16 | 340 | × | — |

Referring to Table 2, moldability was satisfactory and no blister was generated when the flow beginning temperature of the liquid crystal polymer was in a range of 310° C. to 335° C. as in samples 11 to 14.

In contrast, in some of sample 15 with the flow beginning temperature of the liquid crystal polymer being lower than 310° C., a blister was generated. This is believed that because the flow beginning temperature of the liquid crystal polymer was so low that low-molecular weight components were volatilized to thereby cause peeling at the liquid crystal polymer/polytetrafluoroethylene interface having low adhesion, and resultantly a blister was generated during the reflow heat resistance test. Although not shown in Table 2, generation of a blister hardly occurred in samples in which a dielectric inorganic filler, such as calcium titanate and calcium carbonate, was not added, in the composition of sample 15.

In some of sample 16 with the flow beginning temperature of the liquid crystal polymer being higher than 335° C., the molecular weight of the liquid crystal polymer increased and the viscosity of the molding material rose, so that fluidity during molding was inadequate, and a short shot was generated in a molded product, leading to poor moldability. In sample 16, presence/absence of a blister was not evaluated due to poor moldability. Although not shown in Table 2, good moldability was obtained in samples in which a dielectric inorganic filler, such as calcium titanate and calcium carbonate, was not added, in the composition of sample 16.

EXPERIMENTAL EXAMPLE 3

In Experimental Example 3, evaluations were made concerning the added amount of a dielectric inorganic filler and moldability, the dielectric constant, Q and presence/absence of a blister.

In Experimental Example 3, a liquid crystal polymer (flow beginning temperature: 320° C.) similar to that used in Experimental Example 1, polytetrafluoroethylene, a calcium titanate powder and a calcium carbonate powder were prepared, and operations similar to those in Experimental Example 1 were carried out except that these components were weighed so as to have the composition ratios shown in Table 3, and melted and mixed, and moldability was evaluated as shown in Table 3. Presence/absence of a blister was evaluated in the same manner as in Experimental Example 2 as shown in Table 3.

Further, the dielectric constant $\epsilon_r$ and Q were evaluated as shown in Table 3. That is, a specimen having a diameter of 55 mm and a thickness of 1.3 mm was prepared, and the dielectric constant $\epsilon_r$ and Q at 3 GHz were determined by a perturbation method using a network analyzer (manufactured by Agilent Technologies, Inc.; "HP 8510").

TABLE 3

| | Composition Ratio (% by volume) | | | | Evaluation Results for Materials | | | |
|---|---|---|---|---|---|---|---|---|
| Sample Number | Liquid Crystal Polymer | Polytetra-fluoroethylene | Calcium Titanate | Calcium Carbonate | Moldability | εr | Q | Blister |
| 21 | 91.2 | 3.8 | 3.0 | 2.0 | ○ | 4.0 | 1300 | ○ |
| 22 | 52.8 | 2.2 | 23.8 | 21.2 | ○ | 10.2 | 700 | ○ |
| 23 | 72.0 | 3.0 | 23.0 | 2.0 | ○ | 8.3 | 720 | ○ |
| 24 | 96.0 | 4.0 | 0 | 0 | ○ | 3.3 | 1400 | ○ |
| 25 | 72.0 | 3.0 | 25.0 | 0 | ○ | 8.7 | 660 | ○ |
| 26 | 48.0 | 2.0 | 26.4 | 23.6 | × | — | — | — |

Referring to Table 3, adequate fluidity could be retained in the molding material and good moldability was shown in samples 21 to 25 in which the total content of the dielectric inorganic filler including calcium titanate and calcium carbonate is 45% by volume or less.

In contrast, in sample 26 with the total content of the dielectric inorganic filler being more than 45% by volume, fluidity of the molding material was reduced, and a short shot was generated, leading to poor moldability. In sample 26, $\in_r$, Q and presence/absence of a blister were not evaluated due to poor moldability.

$\in_r$ of 4.0 or more could be obtained by keeping the total content of the dielectric inorganic filler at 5% by volume or more as in samples 21 to 23 and 25. In contrast, in sample 24, $\in_r$ was less than 4.0 because the total content of the dielectric inorganic filler was less than 5% by volume.

In sample 25, Q was less than 700 because no calcium carbonate was contained as the dielectric inorganic filler. From this fact, it is found that addition of calcium carbonate is effective for increasing Q and improving antenna efficiency.

DESCRIPTION OF REFERENCE SYMBOLS 1 dielectric antenna
2 dielectric block
3 radiation electrode
7 power supply terminal
8 grounding terminal

The invention claimed is:

1. A material for a dielectric antenna, the material comprising:
an organic polymer material, the organic polymer material containing a liquid crystal polymer and polytetrafluoroethylene, wherein an amount of the polytetrafluoroethylene is 2 to 15% by volume based on a volume of the organic polymer material.

2. The material according to claim 1, wherein the liquid crystal polymer has a flow beginning temperature of no lower than 310° C. and no higher than 335° C.

3. The material according to claim 1, wherein the organic polymer material further contains a dielectric inorganic filler.

4. The material according to claim 3, wherein an amount of the dielectric inorganic filler is 45% by volume or less based on the volume of the organic polymer material.

5. The dielectric antenna according to claim 3, wherein the dielectric inorganic filler contains calcium carbonate.

6. The material according to claim 5, wherein the dielectric inorganic filler also contains calcium titanate.

7. The material according to claim 5, wherein an amount of the calcium carbonate is 50% by weight or less based on a total weight of the dielectric inorganic filler.

8. The material according to claim 1, wherein the liquid crystal polymer comprises constituent monomers of 2-hydroxy-6-naphthoic acid, hydroquinone, 2,6-naphthalenedicarboxylic acid and terephthalic acid.

9. The material according to claim 8, wherein composition ratios of the constituent monomers comprise repeating structural units represented by:

(I)

(II)

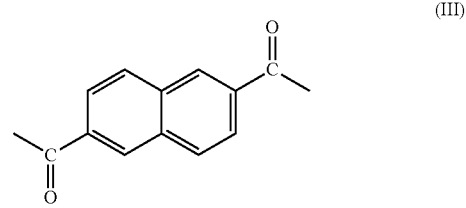

(III)

(IV)

wherein, $Ar_1$ and $Ar_2$ in (II) and (IV) are each independently a group selected from 1,4-phenylene and bivalent residues having two or more phenylenes linked at a para-position.

10. The material according to claim 9, wherein the repeating structural unit (I) constitutes 40 to 74.8 mol %, the repeating structural unit (II) constitutes 12.5 to 30 mol %, the repeating structural unit (III) constitutes 12.5 to 30 mol % and the repeating structural unit (IV) constitutes 0.2 to 15 mol % based on a total of the repeating structural units.

11. The material according to claim 10, wherein the molar ratios of the repeating structural units represented by (III) and (IV) satisfy (III)/{(III)+(IV)}≥0.5.

12. A dielectric antenna comprising:
a dielectric block comprising the material according to claim 1;
a radiation electrode provided on the dielectric block; and
a power supply terminal and a grounding terminal each electrically connected to the radiation electrode.

* * * * *